United States Patent
Zheng et al.

(10) Patent No.: US 10,167,226 B2
(45) Date of Patent: Jan. 1, 2019

(54) ANTI-STATIC AGENT FOR GLASS FIBER INSULATION

(71) Applicant: JOHNS MANVILLE, Denver, CO (US)

(72) Inventors: Guodong Zheng, Highlands Ranch, CO (US); Jawed Asrar, Englewood, CO (US); Derek Cooper Bristol, Littleton, CO (US); Casper Thorning, Boulder, CO (US)

(73) Assignee: Johns Manville, Denver, CO (US)

( * ) Notice: Subject to any disclaimer, the term of this patent is extended or adjusted under 35 U.S.C. 154(b) by 126 days.

(21) Appl. No.: 14/904,682

(22) PCT Filed: Jul. 18, 2013

(86) PCT No.: PCT/US2013/051013
§ 371 (c)(1),
(2) Date: Jan. 12, 2016

(87) PCT Pub. No.: WO2015/009302
PCT Pub. Date: Jan. 22, 2015

(65) Prior Publication Data
US 2016/0159687 A1   Jun. 9, 2016

(51) Int. Cl.
*C03C 25/32* (2018.01)
*C08K 7/14* (2006.01)
(Continued)

(52) U.S. Cl.
CPC .............. *C03C 25/32* (2013.01); *C03C 25/25* (2018.01); *C08K 7/14* (2013.01); *C09D 5/24* (2013.01);
(Continued)

(58) Field of Classification Search
None
See application file for complete search history.

(56) References Cited

U.S. PATENT DOCUMENTS

| 3,827,900 A | 8/1974 | Williams |
| 4,009,132 A | 2/1977 | Furukawa et al. |
| (Continued) | | |

FOREIGN PATENT DOCUMENTS

DE        100 12 814 A1    9/2001

OTHER PUBLICATIONS

Machine translation of DE 10012814, Sep. 2001.*
Abstracts of DE 10012814, Sep. 2001.*

*Primary Examiner* — Erma C Cameron
(74) *Attorney, Agent, or Firm* — Robert D. Touslee

(57) ABSTRACT

A composition includes glass fibers and a polyether antistatic agent. The polyether antistatic agent has a molecular weight of less than about 2000, or less than about 1000. Exemplary polyether antistatic agents include polyethylene glycol, polypropylene glycol, a glycerol polyether, and combinations thereof. The polyether antistatic agent has a viscosity of less than about 600 cSt at 75° F., or less than about 200 cSt at 75° F. The composition may further include a solvent for the polyether antistatic agent; the solvent may include one or more organic soluble electrolytes, water or a combination thereof. Exemplary organic soluble electrolytes include calcium acetate, lithium acetate, an amine acetate, sodium benzoate, and combinations thereof. The composition may be used in various insulation applications, including in an insulation batt, insulation roll, insulation board, insulation pipe or unbonded glass fiber insulation. Methods for making glass fibers for use in insulation and methods for installing unbonded glass fiber insulation are also described.

17 Claims, 3 Drawing Sheets

(51) Int. Cl.
*C09D 5/24* (2006.01)
*E04B 1/76* (2006.01)
*C03C 25/25* (2018.01)
*E04B 1/74* (2006.01)

(52) U.S. Cl.
CPC ...... *E04B 1/7662* (2013.01); *E04B 2001/742* (2013.01)

(56) References Cited

U.S. PATENT DOCUMENTS

| | | |
|---|---|---|
| 2006/0204763 A1 | 9/2006 | Hartman et al. |
| 2011/0086567 A1* | 4/2011 | Hawkins ............. C03C 25/1095 442/327 |
| 2011/0223364 A1 | 9/2011 | Hawkins et al. |
| 2012/0058698 A1 | 3/2012 | Lin et al. |
| 2012/0168054 A1* | 7/2012 | Chen ....................... C03C 25/26 156/62.2 |
| 2013/0047888 A1* | 2/2013 | Mueller ................. C08G 12/00 106/163.01 |
| 2013/0059075 A1* | 3/2013 | Appley .................. C08G 12/00 427/222 |
| 2014/0083328 A1* | 3/2014 | Lochel, Jr. ............. C09J 103/02 106/162.8 |

* cited by examiner

US 10,167,226 B2

ANTI-STATIC AGENT FOR GLASS FIBER INSULATION

FIELD OF THE INVENTION

The present invention relates to an additive for use in glass fiber insulation, and more particularly to an antistatic agent for use in bonded or non-bonded glass fiber insulation.

BACKGROUND

Fiberglass insulation is a good electrical insulator, which often results in the insulation generating a static electrical charge during its manufacture, handling, and installation. During these processes friction between glass fibers or between the fibers and other substrates—such as transport conveyors, duct work, packaging materials, or loose-fill blowing equipment—often results in the generation of static charge on the surface of the fibers that does not quickly dissipate. This static charge can cause fibers to adhere to surfaces or become airborne by mutual repulsion, resulting in a reduction of manufacturing efficiency, degradation of air quality, and/or poor installation efficiency.

Bonded glass fiber insulation is manufactured by forming a batt or roll of the glass fibers on a belt. The edges of the batt are trimmed, and the trimmings are ground in a mill and re-used in the manufacturing process. The re-use of the trimmings is known as "re-feed." Static build-up is not a major concern during formation of the batt/roll, but it can be during the re-feed process.

Non-bonded glass fibers can generate a static charge during both their formation and during their installation (where they are, for example, blown through a tube onto the surface to be treated).

To combat the negative effects from the static charge, antistatic agents ("antistats") are commonly applied during various stages of manufacturing or product use. Antistats may either limit the generation of static electricity or help dissipate any charges that do form. Most antistats, including the class of quaternary amines, are hydroscopic and attract water vapor from the atmosphere, which helps to dissipate static electricity due to the polar nature of water.

Quaternary amines, however, present a number of challenges to their use in glass insulation. They are ineffective at controlling static at relative humidity levels below about 20% because they cannot attract enough water vapor from the air to sufficiently reduce the static charge. Many quaternary amines have a very high viscosity that makes them difficult to apply and evenly distribute requiring the use of viscosity reducing solvents that add cost and may contribute to flammability and volatility of the mixture. They also may cause skin irritation and corrosion to certain metals. In addition, they may contain volatile components, resulting in gas emissions during the manufacture and use of the insulation, particularly where the temperature of the glass fibers may be elevated. The air emissions must be accounted for during manufacturing, and they can cause a disagreeable odor during the manufacture and use of the insulation.

Many known antistatic agents, and in particular commonly used quaternary amines, are also viscous. Some are nearly solid at room temperature. Their viscosity makes them difficult to apply, which can result in excessive buildup on application equipment and other surfaces during the manufacturing process. One known method for reducing the viscosity of the antistatic agent is to dilute it with a solvent such as water. If a solvent is used in the manufacturing process, however, it must either be dried (complicating the manufacturing process), or it remains in the fibers as residual moisture. This residual moisture can degrade the quality of the glass fibers and further contribute to corrosion of contacted metals.

Glass fibers for use in insulation are very fine and fragile, and are thus prone to break into smaller fibers during handling and installation of the insulation. When breakage occurs, fiber dust/particles are introduced into the air, which can cause physical discomfort (breathing difficulty and eye irritation) to persons handling the insulation. To minimize these effects, glass fiber insulation will typically also include a dedusting agent such as mineral oil, which reduces abrasion and fiber breakage by lubricating the surface of the fiber so that less fiber dust is created. In addition, the dedusting agent is a tacky fluid, which "grabs" the broken fibers, helping to prevent them from being introduced into the air. Dedusting agents contribute to the overall weight and cost of the insulation, however.

SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Embodiments of the present invention include polyether antistatic agents used for bonded and non-bonded glass fiber insulation. The polyether antistatic agent is useful in non-bonded glass fiber insulation, such as but not limited to blown glass wool, to minimize static during product processing and/or installation. In addition, the polyether antistatic agent reduces static build-up in bonded glass fiber insulation, such as but not limited to insulation batts, insulation rolls, insulation boards and insulation pipes, during their processing through the trimming/re-feeding system. The polyether antistatic agent is less caustic and corrosive than previously known antistatic agents, has lower flammability, and performs better in controlling dust and static.

In one embodiment, a composition includes glass fibers and a polyether antistatic agent, wherein the polyether antistatic agent has a molecular weight of less than about 2000.

In some embodiments, the polyether antistatic agent may include polyethylene glycol, polypropylene glycol, a glycerol polyether, and combinations thereof. In one embodiment the polyether antistatic agent is polyethylene glycol.

In certain embodiments the polyether antistatic agent has a molecular weight of less than about 1000, and may have a viscosity of less than about 600 cSt at 75° F. or less than about 200 cSt at 75° F.

In further embodiments the composition further includes a solvent for the polyether antistatic agent. In some embodiments the solvent includes one or more organic soluble electrolytes, water or a combination thereof. In yet other embodiments the solvent is an organic soluble electrolyte and includes calcium acetate, lithium acetate, an amine acetate, sodium benzoate, and combinations thereof.

In one embodiment the polyether antistatic agent includes polyethylene glycol, and the composition further includes sodium benzoate and water.

In some embodiments the polyether antistatic agent is provided in the composition in the absence of a solvent.

In certain embodiments an article includes a composition including glass fibers and a polyether antistatic agent, wherein the article is an insulation batt, insulation roll, insulation board, insulation pipe or unbonded glass fiber insulation.

A some embodiments a method for making glass fibers for use in insulation includes forming glass fibers and applying a polyether antistatic agent having a molecular weight less than about 2000 to the glass fibers.

In other embodiments the insulation is unbonded glass fiber insulation or bonded glass fiber insulation.

In further embodiments the polyether antistatic agent is applied to the glass fibers in the absence of a solvent.

In certain embodiments the polyether antistatic agent is applied to the glass fibers as a solution comprising the polyether antistatic agent and a solvent, wherein the solvent comprises one or more organic soluble electrolytes, water or a combination thereof.

In some embodiments a method for installing unbonded glass fiber insulation includes applying unbonded glass fibers on a surface to be treated, wherein a polyether antistatic agent is applied to the unbonded glass fibers as the unbonded glass fibers are being applied on the surface to be treated.

In other embodiments a method for installing unbonded glass fiber insulation, includes applying unbonded glass fibers on a surface to be treated, wherein a polyether antistatic agent is applied to the unbonded glass fibers as the unbonded glass fibers are being applied on the surface to be treated.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Figure 1:
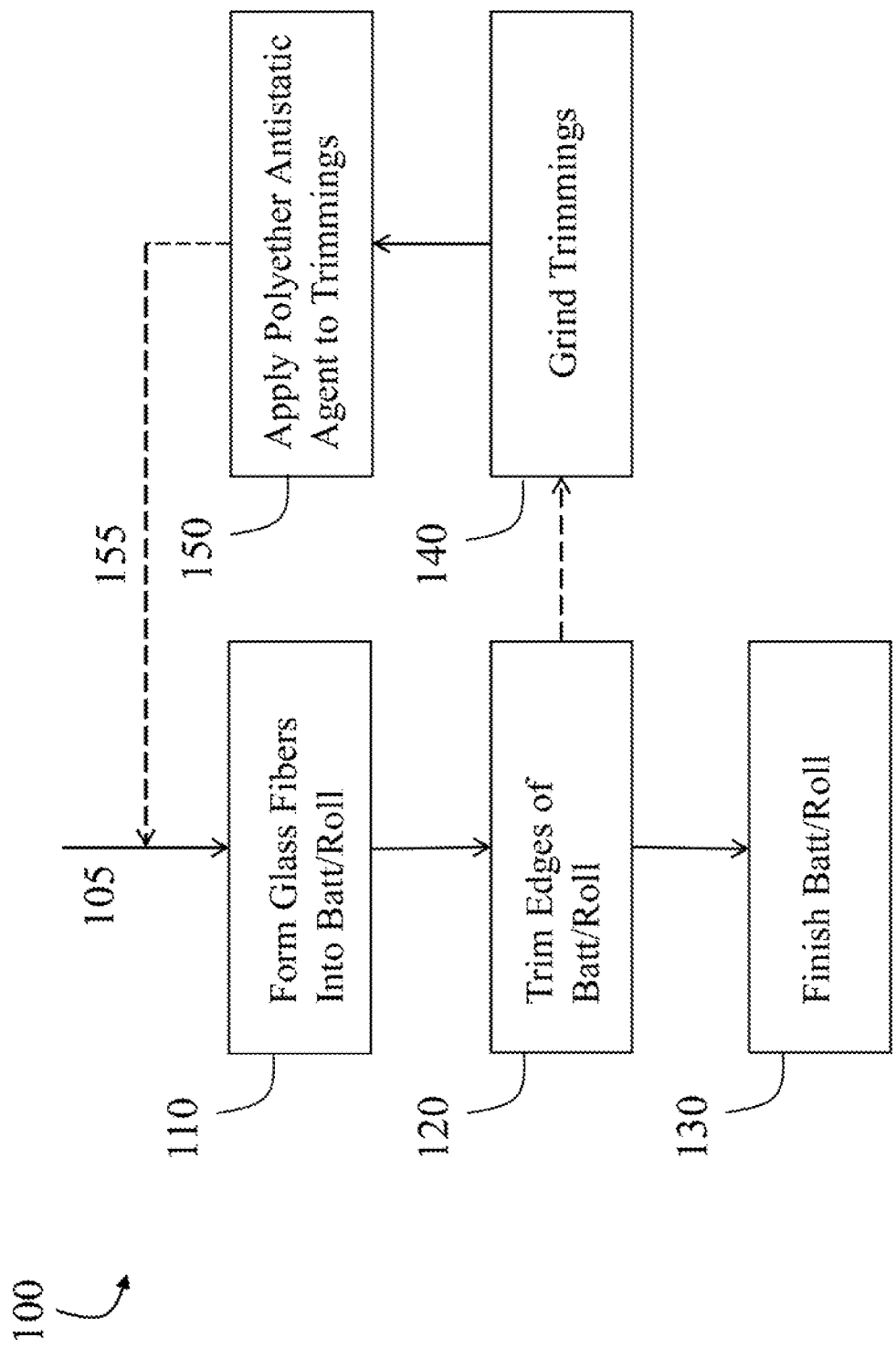
FIG. 1 is a flowchart showing selected steps in a method of making bonded glass fiber insulation according to embodiments of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In embodiments of the present invention, polyethers are provided as antistatic agents for use in the manufacture and/or use of glass fiber insulation. The polyether antistatic agents provide several unexpected benefits over previously known glass fiber antistatic agents. As further explained below, the polyethers are effective at much lower relative humidity levels, and they may have one or more of the properties of lower viscosity, a neutral pH, low toxicity, low volatility, low flammability and minimal odor.

Exemplary polyether antistatic agents according to embodiments of the invention include organic polyether liquids, such as but not limited to polyethylene glycol (PEG), polypropylene glycol (PPG), glycerol polyethers such as the Jeffox® products available from Huntsman, and similar compounds. In some embodiments, the polyether antistatic agents have low volatility, i.e., they have relatively high boiling points and flash points as compared to previously known antistatic agents for use in glass fiber insulation.

In one embodiment, a polyether antistatic agent according to the present invention has a molecular weight of less than about 2000 (less than about 2000 MW). In other embodiments, the polyether antistatic agent has a molecular weight of less than about 1000 (less than about 1000 MW). Polyether antistatic agents having molecular weights in this range may have a relatively low viscosity as compared to previously known antistatic agents, such that they can be applied to the glass fibers during their manufacture or use without the use of a solvent. Generally, as molecular weight increases, so does viscosity. Thus, while polyethers having higher molecular weights can be used as an antistatic agent, it may be desirable to dilute or dissolve these polyethers in a solvent to make them easier to apply.

In some embodiments polyethers according to the present invention may have a viscosity of less than about 600 cSt at 75° F., or less than about 200 cSt at 75° F. Even if a polyether liquid having less than about 2000 MW or less than about 1000 MW and/or a viscosity of less than about 600 cSt or less than about 200 cSt is used, however, it may be desirable to utilize a solvent to further reduce the viscosity of the antistatic agent.

Exemplary solvents suitable for use with the polyether antistatic agents described herein include, but are not limited to, organic soluble electrolytes such as calcium acetate, lithium acetate, amine acetates (e.g., triethanolamine acetate (TEA)), sodium benzoate, and combinations thereof. Another possible solvent for use with the polyether antistatic agents described herein includes water, which may be used on its own or with one or more of the organic soluble electrolytes described herein or with other suitable solvents. As the polyether antistatic agents described herein have a lower viscosity than previously known antistatic agents, however, less solvent can be used than in previously known antistat formulations. It will be recognized that a person skilled in the art could select a suitable solvent or combination of solvents and adjust the amount(s) added to the polyether antistatic agent to achieve desired performance characteristics.

With reference to the data set forth below, polyether antistatic agents according to the present invention have surprisingly been found to neutralize the static charge in glass fiber insulation at a much lower relative humidity than previously known antistatic agents used in such insulation. In addition, it has surprisingly been found that by using the polyether antistatic agents according to the present invention, less antistatic agent and/or less (or no) solvent is required, reducing the amount of antistatic agent (or antistatic agent solution) that must be applied to the glass fibers (the "use rate").

In addition, because these polyether antistatic agents are lower in viscosity, they are easier to apply to the glass fibers and they can be applied "neat" (without a solvent). The agents thus do not buildup excessively on glass fiber manufacturing equipment and unbonded insulation application equipment. This reduced buildup reduces the need for equipment maintenance as well as minimizes the amount of organic residue that might become fuel during a process fire. This reduces the potential for fires to start as well as reduces the severity and duration of any fires that do occur. Many of these agents may also have one or more of the properties of a neutral pH, low toxicity, low volatility, low flammability, and minimal odor, resulting in a reduction in skin irritation issues, metal corrosion, process fires, and odor complaints.

Further, because the polyether antistatic agents can be applied to the glass fibers without solvents such as water, or with substantially reduced amounts of solvent, no drying equipment is needed in the manufacturing process and minimal residual moisture is left on the product, which might otherwise degrade the quality of the glass fibers.

The lubricity of the polyether antistatic agents according to the present invention has also been found to reduce airborne dust levels during manufacture and product installation, which may enable a reduction in the use of other dedusting agents. For example, typical glass fiber constructions currently in use may include up to about 0.8% by weight of a dedusting agent such as mineral oil. It has been surprisingly discovered, however, that glass fiber formulations including the polyether antistatic agents described herein can be formed using substantially lower amounts of dedusting agents, for example less than 0.5% by weight dedusting agent or even less than 0.3% by weight dedusting agent.

In addition, the reduction in antistatic agent use rate, combined with the reduction in dedusting agent use rate, results in a lower installed density of loose-fill insulation, which improves the thermal performance ("R-value") of the insulation per unit of mass.

The polyether antistatic agents according to the present invention may be applied to bonded glass fiber insulation during the manufacture of the batt or roll. In particular, they may be sprayed or otherwise applied to the re-feed fibers in the re-feed process. An exemplary method for forming bonded glass fiber insulation including the polyether antistatic agents according to the present invention is described below and illustrated in FIG. 1. In the method 100, glass fibers 105 are laid onto a batt or roll 110 according to known methods. The edges of the roll or batt are trimmed 120, and the batt or roll is finished 130 according to known methods. The trimmings, including glass fibers, are ground 140 in a mill, and the polyether antistatic agents according to the present invention are applied 150 to the trimmings, which can then be recycled 155 and re-used in the manufacturing process.

Figure 2:
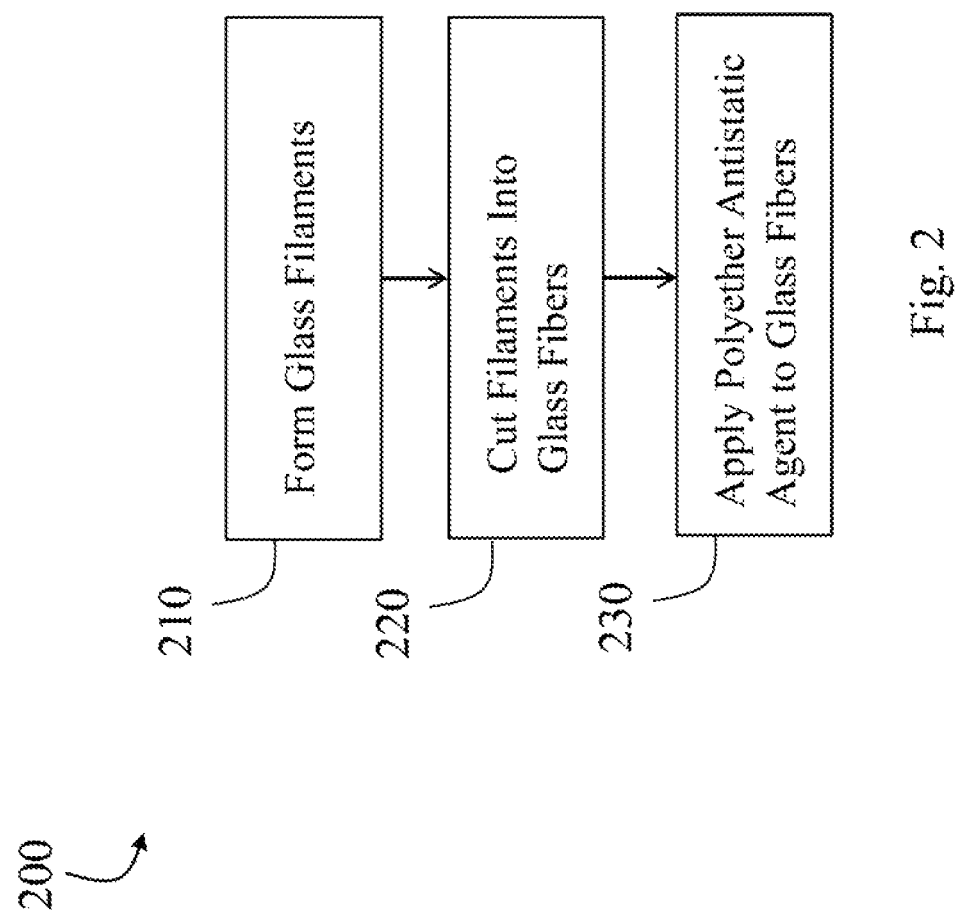
FIG. 2 is a flowchart showing selected steps in a method of making a unbonded glass fiber insulation according to embodiments of the invention.

The polyether antistatic agents according to the present invention may also be applied to unbonded glass fibers during their manufacture or during the installation of the fibers. For example, they could be sprayed onto or otherwise applied to the unbonded fibers during the manufacture of the fibers. Glass fibers may be formed by a rotary fiberization process, a purely exemplary description of which is described in International application no. PCT/US2007/011116, published as WO/2007/133549 on Nov. 22, 2007, the disclosure of which is incorporated by reference in its entirety. An exemplary method for forming unbonded glass fiber insulation including the polyether antistatic agents according to the present invention is described below and illustrated in FIG. 2. In the method 200, glass filaments are formed by, for example, a rotary fiberization process 210. The filaments are cut 220 into glass fibers, and the polyether antistatic agent according to the present invention is applied to the cut fibers 230. Although not illustrated in the figures, it will be understood that the polyether antistatic agent may be applied to the glass filaments during the filament formation process 210, prior to cutting the glass fibers 220, or after formation of the glass filaments but prior to packaging them 220.

Figure 3:
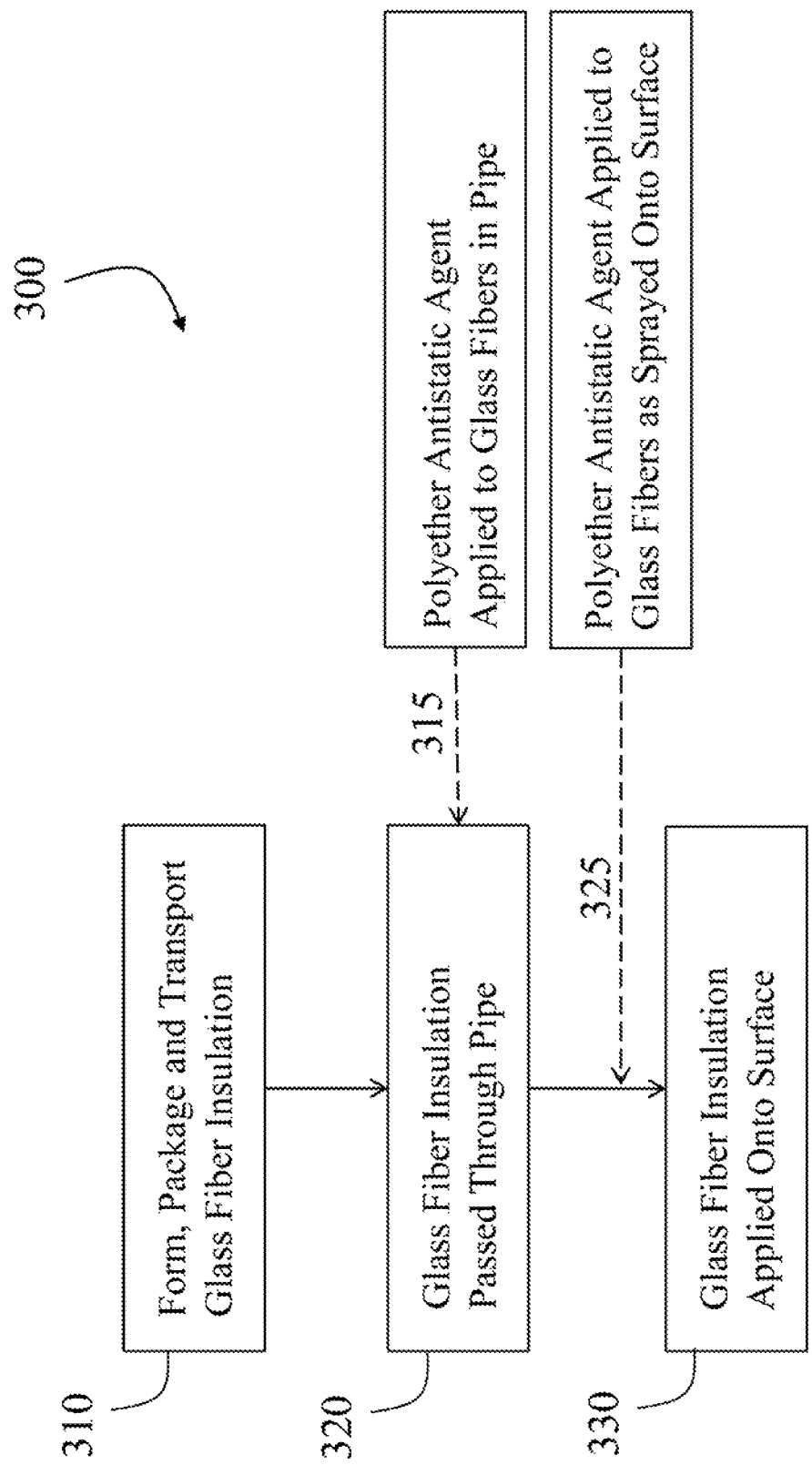
FIG. 3 is a flowchart showing selected steps in a method of applying unbonded glass fiber insulation to a surface to be treated according to embodiments of the invention.

Alternatively, the polyether antistatic agents could be applied to the fibers during installation of the insulation, for example by spraying or otherwise applying them to the glass fibers as they are being sprayed onto the surface to be treated/insulated. An exemplary method for applying the polyether antistatic agents to unbonded glass fibers during installation of the insulation is described below and illustrated in FIG. 3. In the method 300, glass fibers are formed, packaged and transported to a work site 310 according to known methods (such as the rotary fiberization process described above). At the work site (such as a building where the insulation is to be installed), the fibers are transported 320 through a pipe and blown onto the surface to be treated 330. The polyether antistatic agents according to the present invention are applied to the fibers as the fibers are blown out of the pipe 325 or, alternatively, the polyether antistatic agent may be applied to the fibers while they are being transported through the pipe 315 or directly to the fibers as they pass through the blowing machine (not shown).

The polyether antistatic agents could also be applied to the glass fibers after being sprayed onto the surface to be treated/insulated, although it will be recognized that static charges could build up during the application process, resulting in undesirable effects such as those discussed herein.

The polyether antistatic agents according to the present invention are more effective in reducing static charge in the insulation than previously known agents, whether the polyether is mixed with a solvent (e.g., one of the organic soluble electrolytes described above and/or water) or applied to the glass fibers "neat."

When the polyether is pre-mixed with electrolyte, the mixture becomes more electrically conductive, thus reducing any static charge that is generated by rubbing of the glass fibers. Accordingly, the more conductive the antistatic agent, the better performance in controlling static.

In formulations in which the polyether antistatic agent is applied to glass fibers without a solvent, i.e., "neat", the polyether agent functions as a lubricant to reduce friction between fibers or fiber/substrates, thus reducing the static generated. In addition, small amounts of residual conductive materials, such as mineral components from process water on the surface of the glass fibers, results in some electrical conductivity when they dissolve in the polyether agent applied to the fibers. Further, as mentioned above, the hydroscopic attraction of water from the atmosphere may also provide electrical conductivity. These properties result in less static charge generated in the glass fibers and some residual conductivity on the glass fiber surface, the combined effects of which result in the polyether agent functioning as a suitable antistatic agent when applied neat to the glass fibers.

The invention is further illustrated by the following examples, which are not to be construed in any way as imposing limitations upon the scope thereof.

Example 1

Table 1 provides static ratings of insulation treated with previously known antistatic agents as compared to the polyether antistatic agents according to the present invention:

TABLE 1

| | Static Rating | |
|---|---|---|
| | 20% RH | 10% RH |
| Control (standard antistat) | 0.5 | 2.5 |
| Sample (PEG antistat) | 0.5 | 1 |

Static rating scale:
0 - no sign of static charge;
1 - minimal static, normal product behavior;
2 - excessive static, buildup on walls and hose;
3 - extreme static, unable to blow material The Control formulation was applied to glass fibers as a 79/21 mixture of solvents and a quaternary amine. The control (standard antistat) was Larostat 264, available from BASF. An equivalent weight percent of the Sample formulation was applied to glass fibers in neat form. The PEG was Pogol 200, available from Huntsman.

For both the Control and the Sample, the treated glass fibers were blown into a test boat in 20% relative humidity (RH) and 10% RH conditions and a semi-quantitative assessment of the static charge of the glass fibers was made.

From the data in Table 1, it is shown that at 20% RH the Sample (PEG antistatic agent) functioned similarly to the Control agent at the same application rate of active antistatic component. This is primarily due to the ability of both antistatic agents to absorb water vapor from the air, which reduces the static charge due to the polar nature of the water.

At 10% RH, however, it can be seen that the Sample provided a substantial improvement (reduction in static charge) over the Control agent. At such low humidity levels, the Control agent cannot absorb sufficient water vapor from the air to dissipate the static charge. In contrast, although the Sample is also limited in its ability to absorb water vapor from the air, the polyether antistatic agent acts as a lubricant to reduce friction and thus the static generated.

Example 2

Table 2 provides coverage performance for insulation treated with previously known antistatic agents as compared to the polyether antistatic agents according to the present invention:

TABLE 2

| Coverage Performance | | |
|---|---|---|
| | Coverage ($ft^2$) | |
| | Bag 1 | Bag 2 |
| Control (standard antistat) | 58.8 | 60.8 |
| Control (standard antistat; humidity aged) | 59.8 | 60.1 |
| Sample (PEG antistat) | 61.4 | 63.9 |
| Sample (PEG antistat; humidity aged) | 65.1 | 62.1 |

The Control formulation was applied to glass fibers as a 79/21 mixture of solvents and a quaternary amine. The control (standard antistat) was Larostat 264, available from BASF. An equivalent weight percent of the Sample formulation was applied to glass fibers in neat form. The PEG was Pogol 200, available from Huntsman.

Control and Sample bags were humidity aged in 90 degree Fahrenheit, 90% RH conditions for seven days. Each of the Controls and Samples were blown into a standard test boat and their R-30 coverage was calculated in square feet. As shown in Table 2, for each bag the Sample exhibited improved coverage as compared to its respective Control, and showed no evidence of reduced coverage due to the hot/humid aging conditions. This improvement in coverage is due to the elimination of solvent, especially water, from the antistat, which is known to degrade glass fibers during storage resulting in fiber breakage and increased installed density. This higher installed density reduces coverage for a given bag weight.

Example 3

Table 3 provides considers dust generated by insulation treated with previously known antistatic agents as compared to the polyether antistatic agents according to the present invention:

TABLE 3

| Dust Generation | |
|---|---|
| | Dust (in water) |
| Control (standard antistat/standard oil) | 1.6 |
| Control (standard antistat/reduced oil) | 2.7 |
| Sample (PEG antistat/standard oil) | 1.3 |
| Sample (PEG antistat/reduced oil) | 1.6 |

Dust rating scale:
0.0-1.0 Extremely low dust
1.0-2.0 Typical dust level
2.0-3.0 High dust but still within specification
>3.0 Excessive dust; outside specification The Control formulation was applied to glass fibers as a 79/21 mixture of solvents and a quaternary amine. The control (standard antistat) was Larostat 264, available from BASF. An equivalent weight percent of the Sample formulation was applied to glass fibers in neat form. The PEG was Pogol 200, available from Huntsman. The dedusting oil was a light mineral oil with the standard application rate equal to 0.8% by weight of the product. The reduced oil application rate was only 0.24% by weight of the product (i.e. a 70% reduction from the standard rate).

Dust is measured during the coverage blow check process. A device draws ambient air from the blowing area through a filter screen until a steady-state pressure drop is measured. The dust measurements reflect the pressure drop across the filter screen as measured in inches of water.

From the data in Table 3, it is shown that each Sample exhibited improved (lower) dust levels as compared to its respective Control. Further, while the dust results for the Control with reduced oil were almost out of specification, the Sample with reduced oil, while having more dust than the Sample with standard oil, was well within the specification. This confirms that use of the lubricious polyether antistatic agents of the present invention allows less dedusting agent to be used in the glass fiber formulation, while still providing satisfactory dust generation results.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A composition comprising:
    ground glass fiber trimmings, wherein the ground glass fiber trimmings are formed from trimming edges of a batt or roll formed from glass fibers;
    a polyether antistatic agent, wherein the polyether antistatic agent has a molecular weight of less than about 2000; and
    a dedusting agent, wherein the dedusting agent comprises less than 0.3% by weight of the composition.

2. The composition of claim 1, wherein the polyether antistatic agent comprises one or more selected from the group consisting of polyethylene glycol, polypropylene glycol, or a glycerol polyether.

3. The composition of claim 2, wherein the polyether antistatic agent comprises polyethylene glycol.

4. The composition of claim 1, wherein the polyether antistatic agent has a molecular weight of less than about 1000.

5. The composition of claim 1, wherein the polyether antistatic agent has a viscosity of less than about 600 cSt at 75° F.

6. The composition of claim 1, wherein the composition further comprises a solvent for the polyether antistatic agent.

7. The composition of claim 6, wherein the solvent comprises one or more of an electrolyte that is both organic and soluble, water, or a combination thereof.

8. The composition of claim 7, wherein the electrolyte that is both organic and soluble comprises calcium acetate, lithium acetate, an amine acetate, sodium benzoate, and combinations thereof.

9. The composition of claim 1, wherein the polyether antistatic agent comprises polyethylene glycol, and the composition further comprises sodium benzoate and water.

10. The composition of claim 1, wherein the polyether antistatic agent is provided in the composition in the absence of a solvent.

11. An article comprising the composition of claim 1, wherein the article is an insulation batt, insulation roll, insulation board, insulation pipe or unbonded glass fiber insulation.

12. A method for making glass fibers for use in insulation, comprising:
    forming glass fibers;
    forming a first batt or roll from the glass fibers;
    trimming edges of the first batt or roll to produce glass fiber trimmings;
    grinding the glass fiber trimmings;
    applying a polyether antistatic agent having a molecular weight less than about 2000 to the ground glass fiber trimmings;
    applying a dedusting agent to the glass ground glass fiber trimmings; and
    forming a second batt or roll using at least a portion of the glass fiber trimmings after application of the polyether antistatic agent and the dedusting agent, wherein the dedusting agent comprises less than 0.3% by weight of the second batt or roll formed by the ground glass fiber trimmings, the polyether antistatic agent, and the dedusting agent.

13. The method of claim 12, wherein the polyether antistatic agent comprises one or more selected from the group consisting of polyethylene glycol, polypropylene glycol, or a glycerol polyether.

14. The method of claim 12, wherein the polyether antistatic agent has a molecular weight of less than about 1000.

15. The method of claim 12, wherein the polyether antistatic agent has a viscosity of less than about 600 cSt at 75° F.

16. The method of claim 12, wherein the polyether antistatic agent is applied to the glass fibers in the absence of a solvent.

17. The method of claim 12, wherein the polyether antistatic agent is applied to the glass fibers as a solution comprising the polyether antistatic agent and a solvent, wherein the solvent comprises one or more of an electrolyte that is both organic and soluble, water, or a combination thereof.

* * * * *